Sept. 5, 1939.  C. E. RUTHERFORD  2,171,807
OVERFLOOR RACEWAY FITTING
Filed July 17, 1937  2 Sheets-Sheet 1
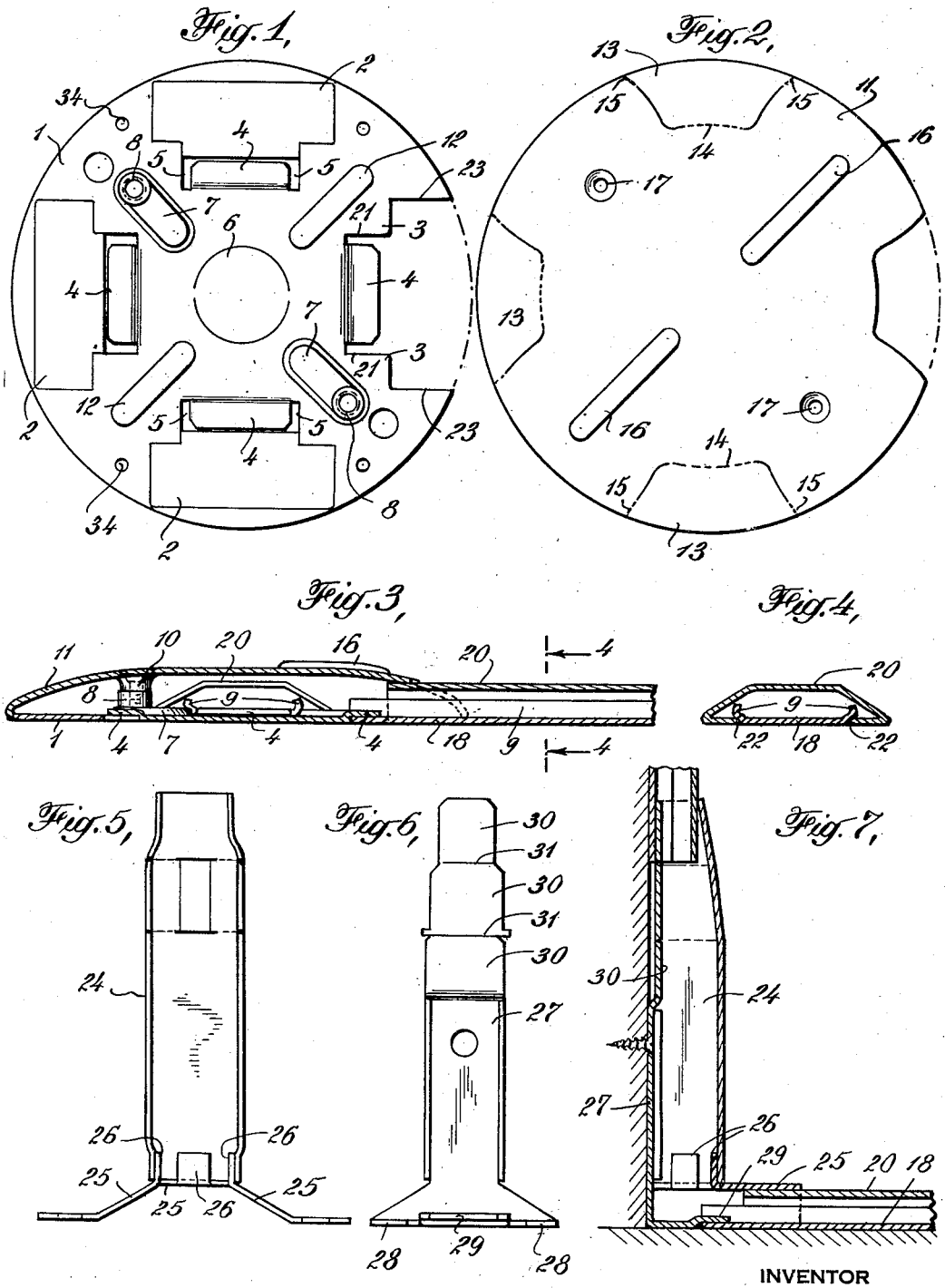
INVENTOR
Charles E. Rutherford
BY
Pennie, Davis, Marvin & Edmonds
ATTORNEY Sept. 5, 1939.　　　C. E. RUTHERFORD　　　2,171,807
OVERFLOOR RACEWAY FITTING
Filed July 17, 1937　　　2 Sheets-Sheet 2
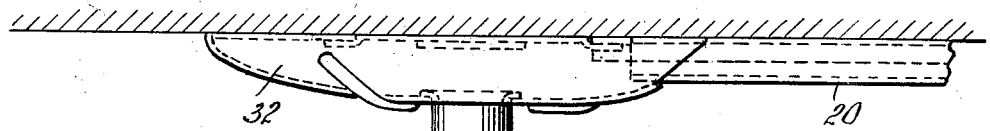
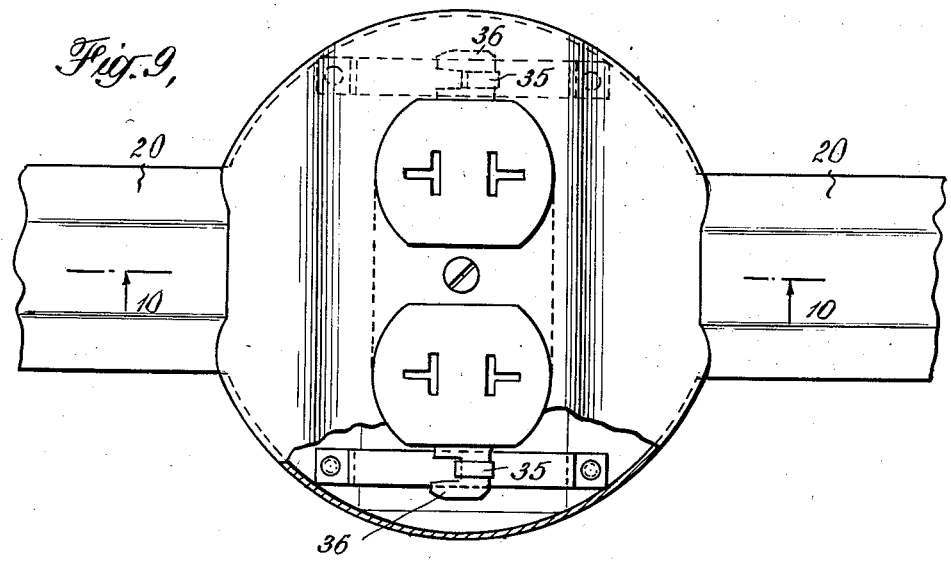
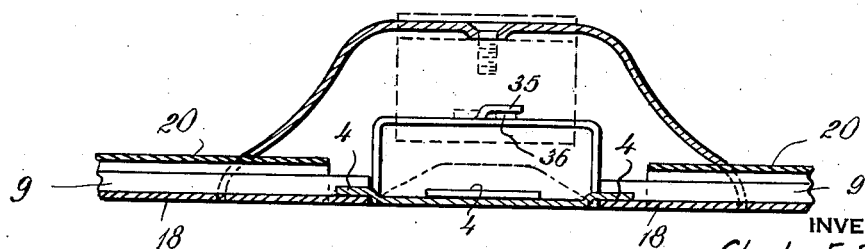
INVENTOR
Charles E. Rutherford
BY
Pennie, Davis, Marvin & Edmonds
ATTORNEYS Patented Sept. 5, 1939

2,171,807

UNITED STATES PATENT OFFICE 2,171,807

OVERFLOOR RACEWAY FITTING

Charles E. Rutherford, West Hartford, Conn., assignor to The Wiremold Company, Hartford, Conn., a corporation of Connecticut Application July 17, 1937, Serial No. 154,307

8 Claims. (Cl. 220—3.2)

This invention relates to electrical conduit fittings. More particularly, the invention contemplates the provision of improved overfloor raceway fittings adapted for use in connection with overfloor raceways for electrical conductors.

When electrical conductors are to be laid over floors it is customary to enclose and protect them in conduits known as overfloor raceways. Overfloor raceways are usually designed with a minimum of depth and the cover portion is shaped so as to eliminate vertical walls to the greatest possible extent in order that the raceway will not present an obstacle to a person walking over the floor. Moreover, both overfloor raceways and overfloor raceway fittings must have sufficient strength to permit a person to step thereon without damaging them. One particularly desirable form of overfloor raceway, comprising a relatively shallow channel-shaped base member and a cover member of substantially greater width, is illustrated and fully described in my United States Patent No. 2,027,619. The overfloor raceway fittings of the present invention are of special utility in connection with overfloor raceways of this type.

The present invention provides improved overfloor raceway fittings that are of simple and rugged construction. They do not present an obstacle to a person walking over the floor. They are adapted for connection to one or more overfloor raceways or to one overfloor raceway and another raceway of greater depth, such for example as is customarily used along the walls of a room, while at the same time substantially entirely enclosing the electrical conductors irrespective of the number of raceways with which the fittings connect.

The improved overfloor raceway fittings of the present invention will be further described in greater detail with reference to the accompanying drawings in which:

Fig. 1 is a plan view of the base member of an improved junction box embodying the invention;

Fig. 2 is a plan view of a cover member which together with the base member shown in Fig. 1 form a junction box embodying the invention;

Fig. 3 is a sectional assembly view of an improved junction box and an overfloor raceway showing the connection between the two;

Fig. 4 is a cross-sectional view of an overfloor raceway taken along line 4—4 of Fig. 3;

Fig. 5 is an interior plan view of the cover member of an elbow fitting adapted to connect an overfloor raceway with a well known form of raceway of greater depth;

Fig. 6 is a plan view of the base member of the elbow fitting shown in Fig. 5;

Fig. 7 is a sectional assembly view of the complete elbow fitting attached to two raceways one of which is an overfloor raceway;

Fig. 8 is a side view of one form of outlet box embodying the invention;

Fig. 9 is a top plan view partly in section of another modified form of outlet box; and Fig. 10 is a sectional view taken along line 10—10 of the modified outlet box shown in Fig. 9.

Referring to Fig. 1 of the drawings the base member comprises a substantially flat circular portion 1, having twist-outs 2 located around the outer portion of the base member. The twist-outs are of such shape that when removed they leave abutment shoulders 3 and a tongue portion 4 adjacent the interior of the base member. The spaces 5 between the sides of the tongue and the rest of the base member are spaced to receive the side walls 9 of the base portion of an overfloor raceway which is shown in cross section in Fig. 4. The tongue portion 4 is raised above the plane of the base member 1 by an amount substanially equal to the thickness of the base portion of the overfloor raceway, and is completely cut away from the twist-out 2 adjacent the interior portion of the latter. The length of the tongue is such that it terminates a substantial distance interiorly of the base member from the abutment shoulders 3. The base member is further provided with a knock-out portion 6 in the center thereof adapted for the introduction of electrical conduits through a floor into the interior of a junction or outlet box of which the base member is an element. Raised portions 7 are also provided upon which bushings 8 may be riveted and tapped to receive screws 10 which secure the cover member 11 of the outlet box to the base member 1. Additional raised portions 12 are provided for strengthening the base portion which is submitted to a certain amount of a strain when the twist-outs are removed.

Fig. 2 shows an improved cover member for a junction box adapted for use with an overfloor raceway. The cover member is substantially dish-shaped with a diameter sufficiently great that the outer rim of the cover member extends over the rim of the base member. The cover member is provided with twist-out portions 13 corresponding to the twist-out portions 2 of the base member. The twist-out portions 13 are appropriately shaped to engage the cover portion of an overfloor raceway. Due to the fact that the twist-out portions comprise a substantial amount of the upper surface of the cover member 11 and are thereby subjected to a substantial distortion if the outlet box is stepped upon, the twist-out portions are supportably attached to the cover member along the dotted line 14 adjacent the inner portion of the twist-out and also along the dotted lines 15 adjacent the two outer extremities thereof. The inner portion of each twist-out is thereby supported while the rim of the cover member is safeguarded against spreading by the support at 15. The portions of the twist-outs indicated by dotted lines 14 and 15 are merely scored while the remaining portion is completely cut away from the cover member. The cover member is further provided with raised portions 16 for strengthening the cover member. Countersunk screw holes 17 are also provided which correspond in their position to the raised bushings 8 in the base portion of the junction box.

Fig. 3 is a cross-sectional view of the assembled junction box and shows the raised tongues 4 as they engage the base portion 18 of an overfloor raceway. The cover member 20 of the raceway projects within the interior of the cover member of the outlet box, but is prevented by stops 3 from covering that part of the base portion of the raceway in engagement with the tongue 4 of the base member of the outlet box. Thus it will be seen that the raceway is securely held in position by tongue 4 and the cover member 11 of the outlet box while ample space is provided for the introduction of electrical conduits from the raceway into the outlet box without being crowded by the tongue 4. The distance between the stops 3 is such that the side walls 21 of the stops engage the recessed portions 22 along the sides of the base member of the raceway. Thus, the base portion of the raceway is securely held from underneath by the side walls 21 and on top by the tongue 4. The distance between the side walls 23 of the twist-out portions is substantially equal to the overall width of the cover member of the raceway so that the cover member may be slid freely along the base portion of the raceway until the cover member is arrested by stops 3. When in place, the upper surface of the cover member of the raceway furnishes support for the shallow cover member of the raceway fitting along the line 14. The cover member of the raceway is in turn supported by the side walls 9 of the base member of the raceway. The side walls 9 of the base member of the raceway extend upwardly into approximate contact with the raceway cover, thereby supporting it against substantial distortion. Thus additional support of the cover member of the raceway fitting at one or more points compensates for weakening caused by removal of the corresponding twist-outs 13.

Figs. 5 and 7 show a form of elbow fitting embodying the invention and adapted to connect an overfloor raceway with an ordinary raceway such as is customarily used on walls. The elbow fitting comprises a cover member which is tapered near the end of one leg 24 and adapted, by appropriate scoring, to be fitted to different sizes of ordinary wall raceways. The leg 24 is secured to a strap-like portion 25 mounted perpendicularly to the axis of the leg 24. The strap-like portion is attached to the cover member in any suitable manner, say, for example, by tongues 26 projecting from the strap-like member and spot welded to the interior of the cover member. The elbow fitting further comprises a base member having one long and relatively narrow leg 27 and a relatively short and wide leg at right angles to the plane of the longer leg 27. The outer end of the short leg is shaped to provide stops 28 and a tongue 29 similar in arrangement to the stops 3 and tongue 4, respectively, shown in Fig. 1. The outer end of the longer leg of the base member is provided with tongues 30 of varying sizes adapted to be twisted off along scored lines 31 to fit wall raceways of different sizes.

The form of outlet box is shown in Fig. 8. This form of outlet box is of the same construction as the junction box shown in Figs. 1, 2 and 3 except that the cover member 32 is provided for a centrally located opening into which one end of a cylindrical stem-like conduit 33 is secured.

A modified form of outlet box embodying the invention is shown in Figs. 9 and 10. Strap-like supports are attached to the face of the base member by appropriate means through holes 34 provided in the base member as shown in Fig. 1. The upper portions of the strap-like supports are provided with raised tongues 35 which engage lugs 36 on the side of an attachment plug receptacle. The receptacle is thereby supported above the base member of the outlet box and a cover member for the outlet box is provided to cover all but the receptacle sockets of the outlet box. One or more raceways may enter the cover member through twist-outs of substantially the same form as that shown in Fig. 2.

In using the fitting of this invention, the base portion of an overfloor raceway is inserted between the side walls of the stops with the web underneath the tongue of the fitting. After the wiring has been installed the cover member of the raceway is snapped onto the base portion of the raceway and slid along it until arrested by the stops on the base portion of the fitting. The cover member of the fitting is then fastened in place.

Thus it will be seen that the present invention provides overfloor raceway fittings of simple construction which are readily adaptable to a number of uses. The improved junction boxes embodying the invention are sufficiently shallow to permit their use under rugs. Further, the improved fittings of the invention do not offer an obstacle to a person walking over them and yet they are strong enough to permit their being stepped upon without damaging them.

I claim:

1. In a conduit system for electrical conductors, the combination of a raceway fitting comprising a base member and a shallow dish-shaped cover member having an opening extending to and inwardly from the rim of said cover member, and a raceway comprising a base member and a shallow cover member of substantially greater width than depth extending through said opening in the cover member of the raceway fitting and supporting the cover member of the raceway fitting at a point inwardly from the rim thereof, said base member having a tongue adapted to engage the base portion of the raceway, said tongue terminating inwardly of the inner edge defining the opening in said cover member.

2. In a raceway fitting adapted for connection to an overfloor raceway of the type comprising a channel-shaped base member and a cover member of substantially greater width than said channel-shaped base member, the improvement comprising a base member and a cover member, said base member having an outwardly extending tongue adapted to engage the base portion of said raceway and terminating at a point interiorly of the outer edge of the cover member, and stops adapted to prevent the raceway cover from extending over that part of the base portion of the raceway in engagement with the tongue of the base member of the raceway fitting.

3. In a raceway fitting adapted for connection to a raceway of the type comprising a channel-shaped base member and a cover member of substantially greater width than said channel-shaped base member, an improved base member having an outwardly extending tongue adapted to engage the base portion of said raceway, and stops extending beyond the outer end of said tongue and adapted to prevent the raceway cover from extending over the base portion of the raceway to the point of engagement with the tongue of the raceway fitting.

4. A raceway fitting comprising a base member and a shallow dish-shaped cover member having a twist-out portion extending to and inwardly from the rim of the cover member removable to form an opening in the cover member adapted to engage the cover portion of a raceway, the twist-out portion being supportably attached to the dish-shaped cover member adjacent the inwardly-extending end of the twist-out portion and adjacent to the two outer extremities thereof.

5. A raceway fitting comprising a base member and a shallow dish-shaped cover member having a twist-out portion extending to and inwardly from the rim of the cover member removable to form an opening in the cover member adapted to engage the cover portion of a raceway, the twist-out portion being firmly attached to the remainder of the cover member adjacent to the two outer extremities thereof.

6. A raceway fitting adapted for connecting to an overfloor raceway of the type comprising a channel-shaped base member and a cover member of substantially greater width than said channel-shaped base member, which comprises a base member having a twist-out portion removable to form a tongue on the base member adapted to engage the base portion of a raceway and stops adapted to prevent the cover portion of the raceway from covering that part of the base portion of the raceway in engagement with the tongue of the base member, said cover member having a twist-out portion removable to form an opening in the cover member adapted to engage the cover portion of a raceway.

7. In a conduit system for electrical conductors, the combination of a raceway fitting comprising a base member and a shallow dish-shaped cover member, said cover member having an opening extending to and inwardly from the rim of the cover member and a twist-out portion extending to and inwardly from the rim of the cover member, said twist-out portion being firmly attached to the main portion of the dish-shaped cover member adjacent the two outer extremities thereof, and a raceway comprising a shallow cover member of substantially greater width than depth, said raceway cover member extending through said opening in the cover member of the raceway fitting and supporting the cover member of the raceway fitting at a point inwardly from the rim thereof.

8. In a conduit system for electrical conductors, the combination of a raceway fitting comprising a base member and a shallow dish-shaped cover member having an opening extending to and inwardly from the rim of said cover member, and a raceway comprising a shallow cover member of substantially greater width than depth extending through said opening in the cover member of the raceway fitting and supporting the cover member of the raceway fitting at a point inwardly from the rim thereof.

CHARLES E. RUTHERFORD.